US006993737B1

(12) United States Patent (10) Patent No.: US 6,993,737 B1
Anderson et al. (45) Date of Patent: Jan. 31, 2006

(54) LEAKAGE POWER OPTIMIZATION FOR INTEGRATED CIRCUITS

(75) Inventors: Jason H. Anderson, Toronto (CA); Farid N. Najm, Mississauga (CA)

(73) Assignee: Xilinx, Inc., San Jose, CA (US)

( * ) Notice: Subject to any disclaimer, the term of this patent is extended or adjusted under 35 U.S.C. 154(b) by 146 days.

(21) Appl. No.: 10/659,918

(22) Filed: Sep. 11, 2003

(51) Int. Cl.
 *G06F 17/50* (2006.01)
(52) U.S. Cl. ....................................................... 716/5
(58) Field of Classification Search .................. 716/1, 716/2, 4–5; 703/14, 18; 365/289.09
 See application file for complete search history.

(56) References Cited

U.S. PATENT DOCUMENTS

| 5,655,109 | A | * | 8/1997 | Hamid | 716/18 |
| 5,696,694 | A | * | 12/1997 | Khouja et al. | 716/5 |
| 5,805,459 | A | * | 9/1998 | Kapoor | 703/14 |
| 5,838,579 | A | * | 11/1998 | Olson et al. | 716/2 |
| 5,903,476 | A | * | 5/1999 | Mauskar et al. | 716/1 |
| 5,949,689 | A | * | 9/1999 | Olson et al. | 703/14 |
| 6,075,932 | A | * | 6/2000 | Khouja et al. | 716/4 |
| 6,195,630 | B1 | * | 2/2001 | Mauskar et al. | 703/18 |
| 6,345,379 | B1 | * | 2/2002 | Khouja et al. | 716/4 |
| 6,674,672 | B2 | * | 1/2004 | Forbes et al. | 365/189.09 |
| 6,687,883 | B2 | * | 2/2004 | Cohn et al. | 716/4 |

OTHER PUBLICATIONS

Halter, Jonathan P., "A Gate-Level Leakage Power Reduction Method for Ultra-Low-Power CMOS Circuits," IEEE Custom Integrated Circuits Conference, 1997, pp. 475-478, IEEE, 3 Park Avenue, 17th Floor, New York, NY., 10016-5997.

Yeap, Gary, "Practical Low Power Digital VLSI Design," 1998, pp. 59-72, available from Kluwer Academic Publishers, 101 Philip Drive, Assinippi Park, Norwell, Massachusetts, 02061.

Anderson, Jason H., "Active Leakage Power Optimization for FPGAs," FPGA '04, Feb. 22-24, 2004, Monterey, California, USA, 9 pages, available from janders@eecg. toronto.edu or Xilinx, Inc., 2100 Logic Drive, San Jose, CA 95124.

* cited by examiner

*Primary Examiner*—Vuthe Siek
(74) *Attorney, Agent, or Firm*—Justin Liu (57) ABSTRACT

A method for reducing leakage power in a system comprises determining the static probability for a signal in the system. If the static probability of the signal is in a high power range, then the signal is modified such that the static probability of the modified signal is in a low power range, and such that functionality of the system is not affected. In some embodiments, where the signal is a digital signal, modifying the signal comprises inverting the signal. In some embodiments, where the system comprises a programmable logic device, modifying the signal has no area or performance penalty.

25 Claims, 5 Drawing Sheets

FIG. 7B

LEAKAGE POWER OPTIMIZATION FOR INTEGRATED CIRCUITS

FIELD OF THE INVENTION

The invention relates to integrated circuits (ICs), and more particularly, to leakage power in ICs.

BACKGROUND OF THE INVENTION

Integrated circuits (ICs) continue to become smaller as technology continues to improve. However, these improvements in technology have made leakage power an increasingly dominant component of total power dissipation. Leakage power has two main forms in modern IC processes: subthreshold leakage and gate leakage. Subthreshold leakage occurs due to a non-zero current in a transistor between its source and drain terminals when the transistor is in an OFF state. Gate leakage, on the other hand, occurs due to tunneling current through the gate oxide of a transistor. Both forms of leakage have increased, as a proportion of total power, due to changes necessitated by the improving technology. For example, with each process generation, supply voltages are reduced. In order to mitigate performance degradations due to the reduced supply voltage, transistor threshold voltages must also be reduced. Reducing threshold voltage, however, leads to an exponential increase in subthreshold leakage. Furthermore, gate oxides are thinned to improve transistor drive capability in advanced processes. This, however, leads to a considerable increase in gate leakage. Leakage power is a growing concern in CMOS design, and at least one recent study suggests that leakage power may constitute over 40% of total power for 70 nm technology.

A programmable logic device (PLD) is a well-known type of digital integrated circuit that can be programmed to perform specified logic functions. Examples of PLDs may include complex programmable logic devices (CPLDs), programmable logic arrays (PLAs), and programmable array logic (PAL) devices. One type of PLD, the field programmable gate array (FPGA), typically includes an array of configurable logic blocks (CLBs) and programmable input/output blocks (IOBs). The CLBs and IOBs are interconnected by a programmable interconnect structure. Some FPGAs also include additional special-purpose circuit blocks (e.g., DLLs, RAM, multipliers, processors).

The CLBs, IOBs, interconnect, and other circuit blocks are typically programmed by loading a stream of configuration data (bitstream) into internal configuration memory cells that define how the CLBs, IOBs, interconnect, and other circuit blocks are configured. The configuration data can be read from memory (e.g., an external PROM) or written into the FPGA by an external device. The collective states of the individual memory cells in the FPGA then determine the function of the FPGA.

FPGAs are a popular choice for digital circuit implementation because of their flexibility, growing density and speed, short design cycle, and steadily decreasing cost. However, the programmability of FPGAs means that more transistors are typically needed to implement a given logic circuit, as compared with custom ASIC technologies. Since leakage power is proportional to total transistor count, leakage optimization is a key design objective in current and future FPGA technologies. Reducing the power consumption of FPGAs has many benefits, including lowering packaging/cooling costs, improving reliability, and enabling the use of FPGAs in low power applications (such as mobile electronics).

In contrast to ASICs, a circuit or function implemented on an FPGA typically uses only a fraction of the FPGA's total available resources. Leakage power, however, is dissipated in both the used and the unused portions of an FPGA. This further exacerbates the leakage power problem in FPGAS. In the used part of an FPGA, leakage can be categorized as either active mode or sleep (or standby) mode leakage power. Standby leakage power is that consumed in circuit blocks that are temporarily not in use and that have been put into a special "sleep" state, in which leakage is minimized. Active leakage power is consumed in circuit blocks that are "awake" (blocks that are in use).

Prior attempts to reduce and optimize leakage power have been concerned mainly with reducing standby leakage power. Some attempts to address active leakage power problems include raising the threshold voltage of transistors in non-critical paths or when high circuit performance (speed) is not needed, and replacing individual transistors with "stacks" of transistors coupled in series or with transistors having long channel lengths. Each of these previous leakage reduction techniques has an associated cost impacting circuit area, delay, and/or fabrication cost.

Therefore, a need exists for a method to reduce active leakage power with little or no cost.

SUMMARY OF THE INVENTION

In accordance with the present invention, a method for reducing leakage power in a system comprises determining the static probability for a signal in the system. If the static probability of the signal is in a high power range, then the signal is modified such that the static probability of the modified signal is in a low power range, and such that functionality of the system is not affected. In some embodiments, where the signal is a digital signal, modifying the signal comprises inverting the signal. In some embodiments, where the system comprises a programmable logic device, modifying the signal has no area or performance penalty.

In accordance with the present invention, a system optimized for reduced leakage power comprises a signal source having a modifiable output for sourcing a signal, and a signal sink having a modifiable input for sinking the signal. The signal is selectively modified by the modifiable output of the signal source and the modifiable input of the signal sink such that the signal has a static probability that is in a low power range, and such that functionality of the system is not affected. In some embodiments, the signal is a digital signal, the modifiable output is an invertible output, the modifiable input is an invertible input, and selectively modifying the signal comprises selectively inverting the signal. In some embodiments, the system comprises a programmable logic device having a lookup table.

Additional novel aspects and embodiments are described in the detailed description below. The appended claims, and not this summary, define the scope of the invention.

BRIEF DESCRIPTION OF THE DRAWINGS

The present invention is illustrated by way of example, and not by way of limitation, in the following figures, in which like reference numerals refer to similar elements.

DETAILED DESCRIPTION

The present invention is believed to be applicable to a variety of circuits and systems. The present invention has been found to be particularly applicable and beneficial for programmable logic devices, including field programmable gate arrays. While the present invention is not so limited, an appreciation of the present invention is presented by way of specific examples, such as with an FPGA comprising an array of configurable logic blocks having lookup tables for implementing logic functions.

In the following description, numerous specific details are set forth to provide a more thorough understanding of the present invention. However, it will be apparent to one ordinarily skilled in the art that the present invention can be practiced without these specific details. In other instances, well-known circuits and devices may be omitted or presented in abstract form in order to avoid obscuring the present invention.

Figure 1A:
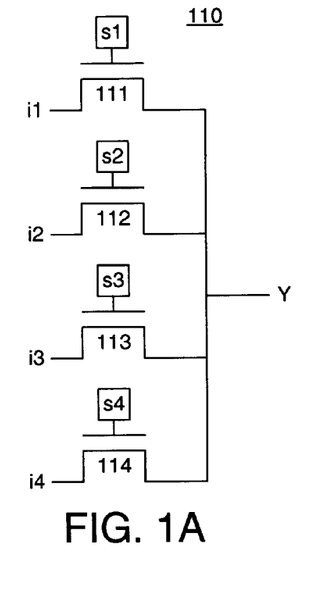
FIGS. 1A–1C show two possible embodiments of a 4-to-1 multiplexer, and a graph indicating power consumed by each circuit.

FIG. 1A shows an implementation of a 4-to-1 decoded multiplexer 110. Decoded multiplexer 110 comprises 4 pass gates 111–114. Each pass gate 111–114 is controlled by a respective memory bit s1–s4, and each pass gate 111–114 is connected at one end to a respective input i1–i4. The other ends of pass gates 111–114 are connected together to form an output Y. In order to select one of the inputs i1–i4, the memory bits s1–s4 are programmed so that one of pass gates 111–114 is enabled while the other pass gates are disabled. For example, to pass the signal at input i2 to output Y, memory bit s2 is programmed to turn on pass gate 112 (e.g., by setting memory bit s2 to a logic 1) and memory bits s1, s3, and s4 are programmed to turn off pass gates 111, 113, and 114 (e.g., by setting memory bits s1, s3, and s4 to a logic 0).

Figure 1B:
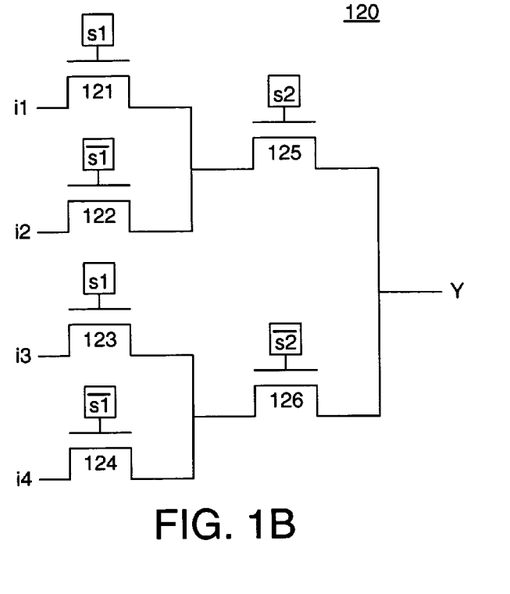

FIG. 1B shows an implementation of a 4-to-1 encoded multiplexer 120. Multiplexer 120 comprises 6 pass gates 121–126, which are controlled by memory bits s1 and s2, and their complements (represented by $\bar{s}1$ and $\bar{s}2$ in FIG. 1B), and, like multiplexer 110, selects one of inputs i1–i4 to pass to output Y. In contrast with multiplexer 110, multiplexer 120 only requires two memory bits to select one of its four inputs. For instance, to pass the signal at input i2 to output Y, memory bit s1 would be de-asserted, thereby enabling pass gates 122 and 124, and disabling pass gates 121 and 123. Memory bit s2 would be asserted, enabling pass gate 125 and disabling pass gate 126, thus creating a path through enabled pass gates 122 and 125 for input i2 to output Y.

Figure 1C:
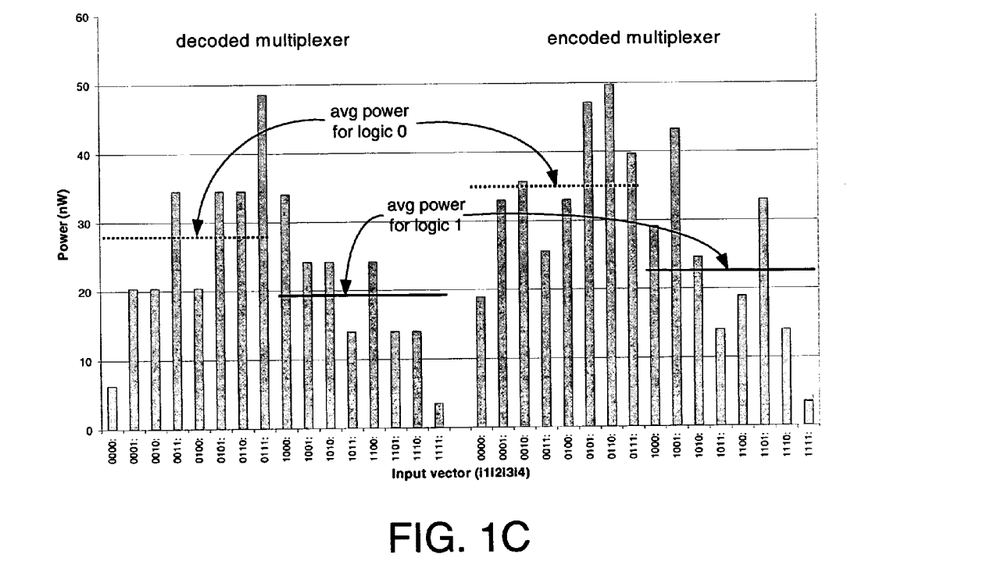

FIG. 1C shows the results of simulation for circuits 110 and 120 shown in FIGS. 1A and 1B. The simulation results are based on BSIM4 SPICE models for a typical 1.2V, 90 nm commercial CMOS IC process. For the simulation, each of the multiplexers 110 and 120 had its memory bits configured to pass the signal at input i1 to output Y, and each circuit was simulated with all 16 possible input values at inputs i1–i4.

The left half of the graph shows the results for decoded multiplexer 110 and the right half of the graph shows the results for encoded multiplexer 120. The height of the bar above each input vector represents the leakage power for that input vector. As can be seen in FIG. 1C, the leakage power is highly dependent on the state of the inputs. For decoded multiplexer 110, the maximum leakage power is approximately 13.7 times the minimum leakage, and for encoded multiplexer 120, the difference is even greater with maximum leakage power approximately 14.2 times the minimum leakage.

FIG. 1C also shows the difference in average leakage power consumed in each circuit for the two possible output states (i.e., outputs of logic 0 and 1). The dotted lines represent the average leakage power when the output Y of each circuit is a logic 0, and the solid horizontal lines represent the average leakage when the output Y is a logic 1. In both multiplexers, the average leakage when the output is a logic 1 is substantially lower than when the output is a logic 0. This difference can be attributed to several factors. First, when an NMOS transistor passes a logic 1, the actual output is a "weak 1" due to a threshold voltage drop across the transistor. In multiplexers 110 and 120, which use NMOS pass gates, the weak 1 at the output leads to reduced subthreshold leakage in the pass gates that are off. Further, there is a significant reduction in gate leakage when the output is a logic 1 as compared to an output of logic 0. When an NMOS transistor is passing logic 0, the voltage difference between its gate and source terminals is VDD, meaning the transistor is in the strong inversion state. Conversely, when the transistor is passing logic 1, the transistor is in the threshold state where the gate-source voltage equals the threshold voltage. Gate leakage in the threshold state is typically several orders of magnitude smaller than leakage in the strong inversion state.

Figure 2:
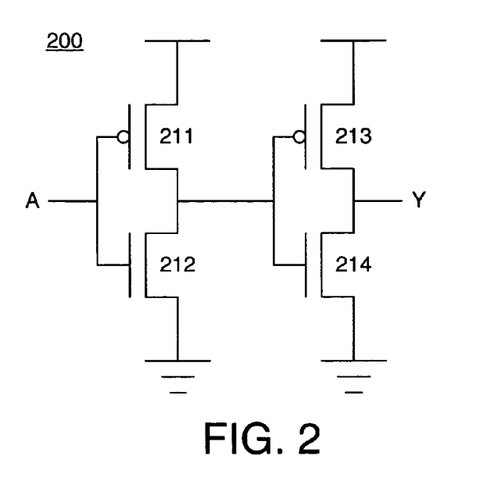
FIG. 2 shows an embodiment of a CMOS buffer.

FIG. 2 shows a typical CMOS buffer 200. The buffer comprises two PMOS transistors 211 and 213, and two NMOS transistors 212 and 214. The transistors are connected as cascaded CMOS inverters, and buffer 200 has an input A and an output Y. Buffer 200 was then simulated under conditions similar to the conditions used for simulating multiplexers 110 and 120. For the simulation, the transistors in FIG. 2 were sized for substantially equal rise and fall times, with the second stage approximately three times larger than the first stage. Like multiplexers 110 and 120, when the input to (and therefore the output from) buffer 200 is a logic 0, the average leakage power is approximately 56.1 nW, and when the input to buffer 200 is a logic 1, the average leakage is approximately 46.6 nW. That is, about 20% more power is consumed in buffer 200 when its input (and therefore its output) is a logic 0 than when its input is a logic 1.

These simulation results indicate that the leakage power performance of a circuit, including multiplexers and buffers, may be dependent on the collective state of its inputs. In general, regardless of the technology or the circuit configuration, the power consumed in a circuit is dependent on the state of its inputs. That is, a circuit will consume a different amount of active leakage power for different input vectors, and moreover, a circuit will generally have minimum leakage power for a particular set of input vector(s). Identifying the input vector that results in minimum leakage power is discussed in J. Halter and F. Najm, "A Gate-Level Leakage Power Reduction Method for Ultra-Low-Power CMOS Circuits", Proc. of the Custom Integrated Circuits Conference, pp. 475–478, 1997. The description and examples used in this specification assume that logic 1 is the signal state associated with low circuit leakage power; however, as one of ordinary skill in the art will readily understand, straightforward variations may be made if the converse were true (e.g., a signal in a logic 0 state results in less power consumed than a signal in the logic 1 state). Furthermore, the techniques described herein are also applicable to other technologies, including those having multilevel signals.

Every signal in a digital circuit has a "static probability." The static probability is equal to the fraction of time that the digital signal spends in the logic 1 state. For instance, a signal having a static probability of 0.75 spends 75% of its time in the logic 1 state (and therefore spends 25% of its time in the logic 0 state). The static probability of a signal may be determined by simulation tools or through well-known probabilistic techniques, such as those discussed in G. Yeap, "Practical Low Power Digital VLSI Design", pages 59–72, published by Kluwer, 1998. For analog, multi-level logic, and other (non-digital) circuits, properties similar to static probability can be defined for signals that specify the fraction of time signals spend in particular states.

Figure 3:
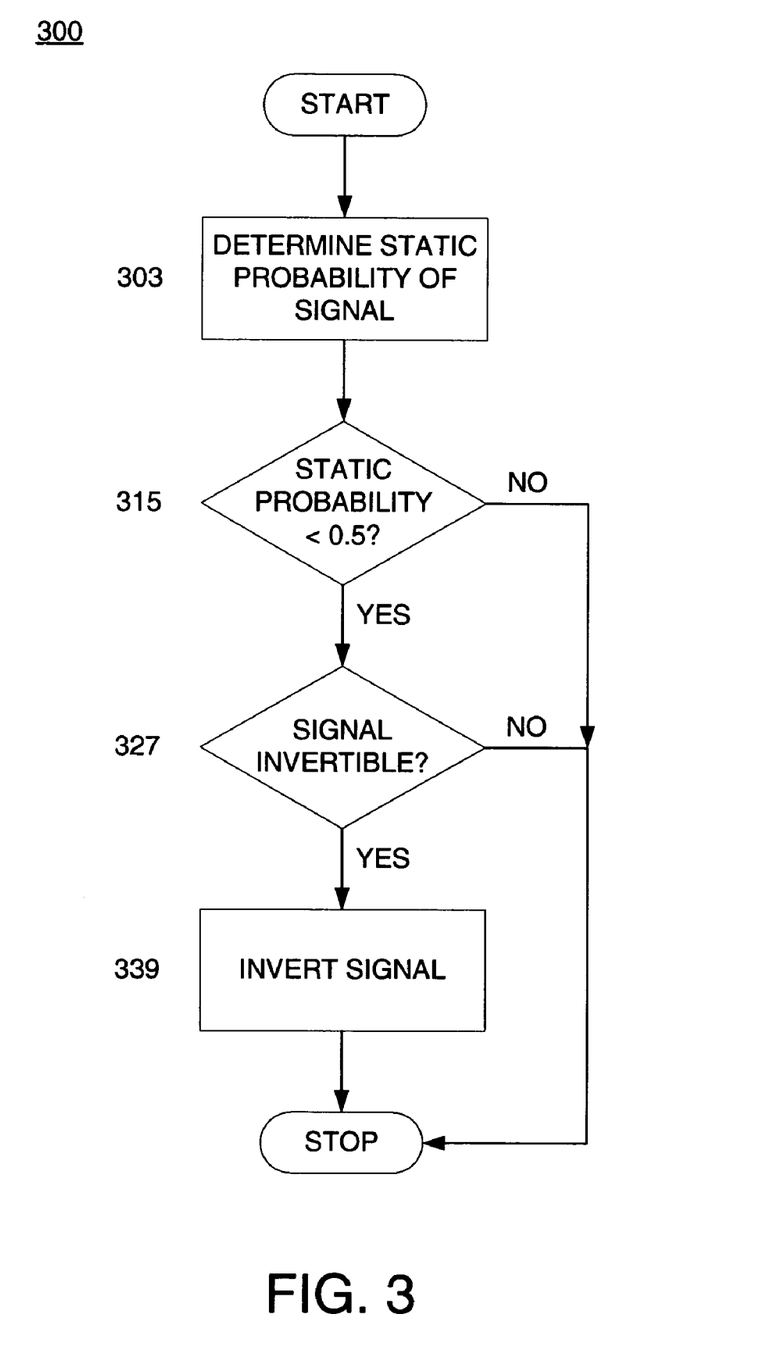
FIG. 3 is a flow diagram illustrating a method for optimizing leakage current in a system.

FIG. 3 illustrates a method 300 for optimizing the active leakage power consumed due to a particular signal in a system. First, in step 303, the static probability of the signal in the system is determined. Many commercially available tools, such as the simulation tools available from Synopsys, Inc. of Mountain View, Calif., have the capability to determine static probabilities. Next, in decision step 315, the static probability of the signal is examined to determine if it is in a high power range or a low power range. For instance, if the static probability is greater than or equal to 0.5, meaning the signal spends at least half its time in the low power logic 1 state, then the signal has a static probability in the low power range (e.g., from 0.5 to 1). Thus, the signal already has a static probability for which the leakage power of circuits associated with the signal is optimized, and no further action is necessary.

If, on the other hand, the static probability is less than 0.5, then the signal spends more than half its time in the high power logic 0 state. That is, the signal has a static probability that is in the high power range (e.g., from 0 to 0.5). For a signal having a static probability in the high power range, the process continues to decision step 327 where it is determined if the signal may be inverted (or, for non-digital or multilevel signals, otherwise modified so that the static probability of the modified signal is in a low power range). In some cases, for example if a signal must have a specific polarity in order for compatibility with an external device, it may not be possible to invert (or otherwise modify) the signal. In such cases, since the signal cannot be further optimized, the process is finished. Otherwise, the process continues to step 339 where the signal is inverted (or for non-digital signals, otherwise altered). This optimizes the active leakage power consumed by circuits associated with the signal by changing the signal so that its static probability is moved from a high power range to a low power range. Method 300 may be repeated for each signal in a particular design to optimize the entire design.

Figure 4A:
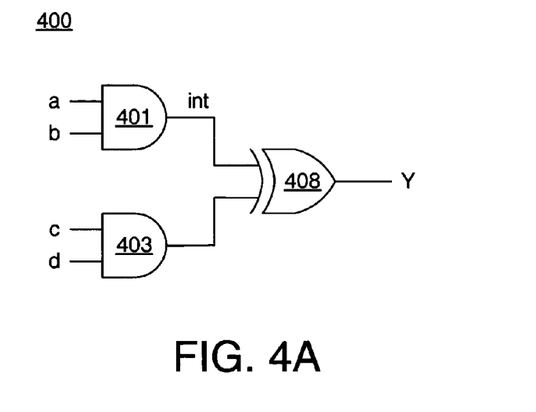
FIGS. 4A–4C show three embodiments of a combinational logic circuit.

Inverting a digital signal means inverting the output at the source of the signal and inverting the inputs of all sinks (or fanouts) of the signal. FIG. 4A shows a simple combinational logic circuit 400 having 4 inputs a–d and an output Y, the circuit comprising two AND gates 401 and 403, and an XOR gate 408. Circuit 400 has an internal signal int connecting the output of AND gate 401 to an input of XOR gate 408. In this example, assume that the static probability of signal int is less than 0.5. Thus, in order to optimize the leakage power, the signal int may be inverted. Although not shown in circuit 400, the routing for signal int may include a number of buffers that are similar to buffer 200 in FIG. 2. The buffers may consume less leakage power when their input is logic 1 versus logic 0. By inverting signal int, power consumed in the buffers in minimized. As shown in circuit 410 of FIG. 4B, int may be inverted, for example, by inserting an inverter 411 at the output of AND gate 401 (the source of signal int) and by inserting an inverter 418 at the input of XOR gate 408 (the sink of signal int). As another example, as shown in circuit 420 of FIG. 4C, signal int may be inverted by replacing AND gate 401 with NAND gate 421 and by replacing XOR gate 408 with XNOR gate 428. As those ordinarily skilled in the art will appreciate, other straightforward techniques and circuits may be used to invert signal int.

Figure 4B:
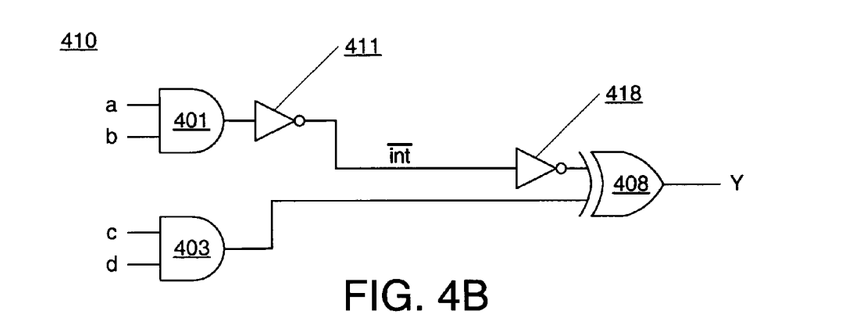
Figure 4C:
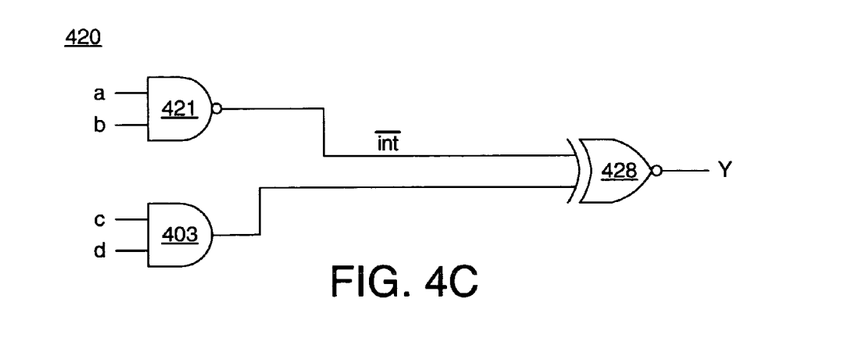

Note that the overall functionality of the logic circuit has not been changed by the inversion shown in FIGS. 4B and 4C. That is, the output Y of both circuits 410 and 420 for any given input a–d is the same as the output Y in circuit 400 of FIG. 4A for the same input. However, since the internal signal int has been inverted, the leakage power consumed in the circuit may be decreased. Importantly, a method for optimizing leakage power in accordance with the present invention does not alter the functionality of the circuit. Note that if a signal to be inverted has multiple sources and/or sinks, the output of every source and/or the input of every sink of that signal must be inverted in order to maintain equivalent functionality.

Figure 5A:
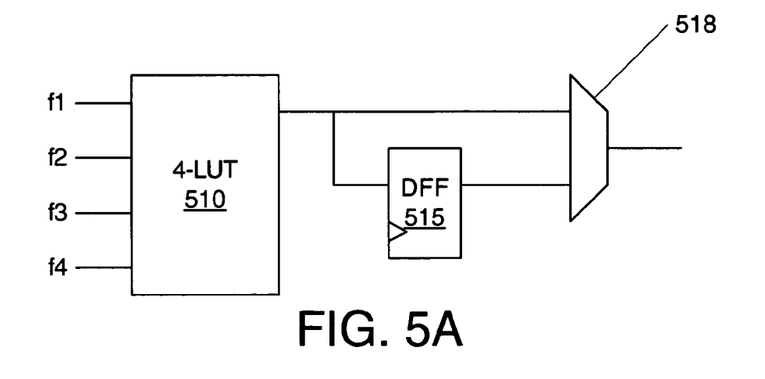
FIGS. 5A and 5B show example block diagrams of typical programmable logic device components.

As stated earlier, programmable logic devices are valued for their flexibility. One type of PLD, the field programmable gate array (FPGA), typically includes an array of configurable logic blocks (CLBs) and programmable input/output blocks (IOBs) interconnected by a programmable interconnect structure. A typical CLB in an FPGA may contain one or more clusters of lookup tables (LUTs) and/or registers. An example is illustrated in FIG. 5A, which shows a 4-input LUT 510, a register 515, and a multiplexer 518 for optionally bypassing register 515. Most commercial FPGAs use a 4-input LUT (4-LUT) to implement combinational logic, although a LUT may have any number of inputs. The 4-LUT is a small memory that can implement any combinational logic function having up to 4 inputs.

Figure 5B:
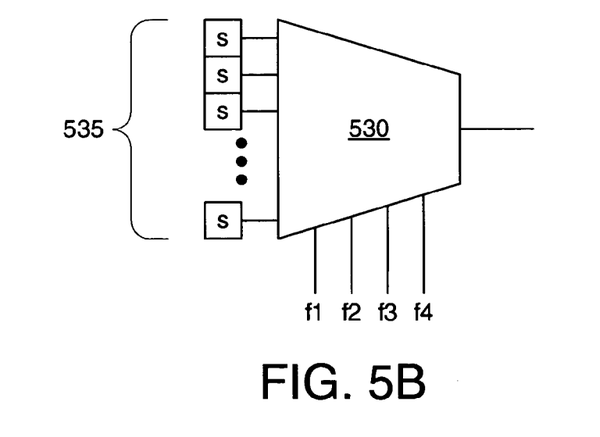

For example, FIG. 5B shows a representation of a 4-LUT. As shown, a 4-LUT 530 has 16 memory cells 535, and the four inputs f1–f4 to 4-LUT 530 select one of the memory cells 535 whose contents is passed to the output. In some embodiments, the memory cells 535 are SRAM (static random access memory) cells. The memory cells 535 contain the truth table for the combinational logic function implemented by the 4-LUT.

Figure 6:
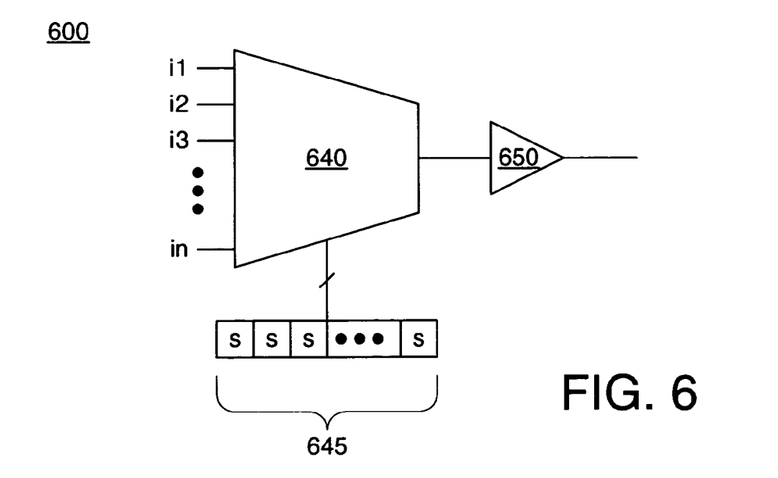
FIG. 6 shows a block diagram of a routing switch.

The programmable interconnect structure in an FPGA may comprise a plurality of routing switches. The routing switches may be used to selectively couple CLBs, IOBS, and/or other components within an FPGA. An example of a typical routing switch 600 is shown in FIG. 6. Routing switch 600 comprises a multiplexer 640, an optional buffer 650, and memory cells 645 for configuring the switch. In some embodiments, multiplexer 640 may be implemented as a pass gate tree similar or identical to either multiplexers 110 and 120 of FIGS. 1A and 1B. As shown, routing switch 600 selects one of its inputs i1–in to pass to its output, which may be buffered by buffer 650. Memory cells 645, which may be SRAM cells, determine which one of signals i1–in will be routed to the output of switch 600.

As previously described, multiplexers and buffers in a typical technology process consume less leakage power when passing a logic 1 rather than a logic 0. Both multiplexers and buffers are used extensively throughout a typical FPGA, for example in the programmable interconnect structure, and thus reducing leakage power consumed in these circuits can significantly reduce the overall power consumed by an FPGA. A method in accordance with the present invention, such as method 300 described above with respect to FIG. 3, may be used to reduce the active leakage power in FPGAs and other PLDS. That is, for each signal in a design implemented on an FPGA, the static probability may be determined (step 303). If the determined static probability is less than 0.5 (step 315), and the signal is invertible (step 327), then the signal may be inverted (step 339) to reduce the power consumed in the circuit due to that signal.

Furthermore, in typical FPGAs, most signals are sourced and sinked by CLBs, and more specifically by the LUTs in the CLBS. Other signals may be provided to and from an FPGA from external sources through the FPGA's IOBs. Importantly, a signal that is both sourced and sinked by LUTs may be inverted with no cost in area or performance. This is illustrated and described in greater detail with reference to FIGS. 7A and 7B.

Figure 7A:
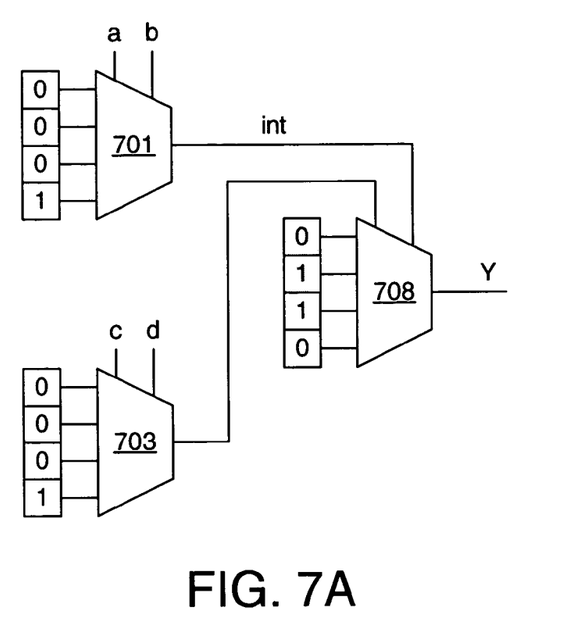
FIGS. 7A and 7B show embodiments of a combinational logic circuit implemented using lookup tables.

FIG. 7A shows an implementation of combinational logic circuit 400 (from FIG. 4A) using 2-LUTs (i.e., 2-input LUTs). The circuit has the same four inputs a–d and output Y, and comprises 2-LUTs 701 and 703, which implement AND gates, and 2-LUT 708, which implements an XOR gate. As can be seen, for any given input vector at inputs a–d, the output Y will be the same as the output Y in circuit 400 for the same inputs. As in the example of FIG. 4A, an internal signal int has been identified as a candidate for inversion based on method 300 (FIG. 3).

Figure 7B:
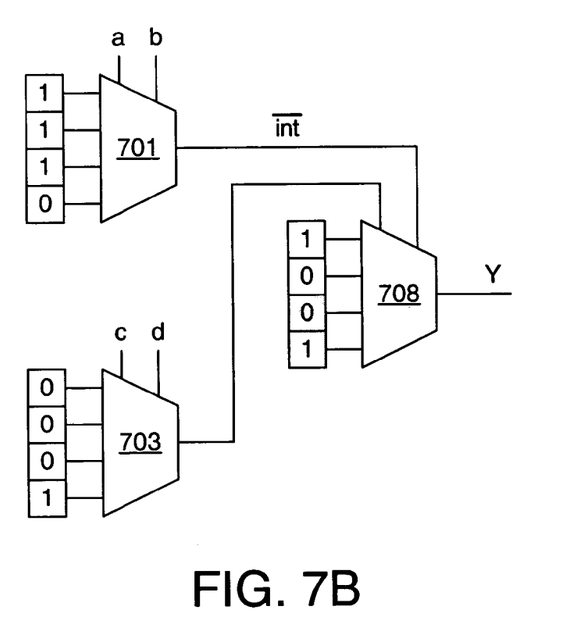

As with the examples of FIGS. 4B and 4C, in order to invert signal int, the output of every source and the input of every sink of signal int must be inverted. In FIG. 7A, the source of signal int is 2-LUT 701. Inverting the output of 2-LUT 701 means inverting each of the memory bits in the truth table that makes up 2-LUT 701. That is, each memory bit that is a logic 0 is inverted to a logic 1, and each memory bit that is a logic 1 is inverted to a logic 0. Thus, as shown in FIG. 7B, which depicts the state of the 2-LUTs after inversion, the output of 2-LUT 701 is inverted. The power consumed by 2-LUT 701 is reduced since its output signal now spends the majority of time in the low power state.

Signal int of FIG. 7A is sinked by 2-LUT 708. In order to invert an input to a lookup table, the memory cell contents of the table must be permuted such that the LUT expects an inverted input. Specifically, this means swapping portions of the memory bits that make up the LUT. For instance, in the example of FIG. 7A, the shaded portion of 2-LUT 708 is swapped with the unshaded portion. That is the contents of the top two bits are interchanged with the contents of the bottom two bits in 2-LUT 708. The resulting state of 2-LUT 708 is shown in FIG. 7B.

Thus, as shown in FIG. 7B, the signal int may be inverted such that its complement, signal $\overline{int}$, is propagated between 2-LUT 701 and 2-LUT 708. As can be further seen, the only change required to achieve this inversion is reprogramming the contents of the memory cells in the 2-LUTs. That is, no circuit changes are necessary in order to invert a signal for reduced leakage power consumption. This results in a reduction of active leakage power consumed without any area or delay penalties. Any signal in a PLD that has LUTs for sources and sinks may be inverted in this manner. Note that a method for reducing leakage power may be applied to a design to be implemented on a PLD prior to actual configuration of the PLD. That is, the analysis of static probabilities and alteration of contents of memory cells in the LUTs of a PLD may be performed while the system is being designed, thereby optimizing the leakage power during the design phase. In this manner, the bitstream provided to the PLD for configuration already contains a design that is optimized for leakage power. In some embodiments, optimization of leakage power in a system is performed after synthesis of the design.

Furthermore, it may be possible to invert signals in a PLD even if the signal is not sourced and sinked by LUTS, for instance when the signal is provided from or sent to an external device. For example, a PLD may include optional inverters built into the IOBs that allow off-chip signals to be inverted just after entering the PLD or just before leaving the PLD. As another example, it may be possible to redesign the external device such that it provides or is configured to receive an inverted signal. In some special cases, such as where the external device is a LUT in another PLD, it may be possible to invert the signal with no cost in area or performance.

While not shown in FIGS. 7A and 7B, the LUTs in an FPGA are typically connected to each other through the programmable interconnect structure. For example, signal int may pass through the programmable interconnect, including possibly several routing switches (similar or identical to routing switch 600 of FIG. 6) and several buffers (similar or identical to buffer 200 of FIG. 2), as it travels from the output of 2-LUT 701 to the input of 2-LUT 708. Moreover, in general, most signals in a PLD will typically pass through one or more switches and buffers in the programmable interconnect. This means that the reduction in active leakage power may be very significant, especially for signals that are routed through many switches and buffers. For example, in one empirical test, active leakage power consumed in the tested circuits was reduced by an average of 22%.

Note that for signals that have a static probability of 0.5, or very close to 0.5, the methods described herein may not significantly improve leakage power consumption, since inverting a signal that has a static probability of 0.5 still leaves a signal with a static probability of 0.5. This effect may be mitigated by various techniques. For instance, it may be possible to redesign the circuit to configure such signals differently, such that they are biased with a static probability closer to 0 or closer to 1, thereby increasing the effect of the methods described herein. As another example, such signals may be routed such that each passes through the least number of devices between its source and sink. For instance, in an FPGA, placing the source and sink physically closer together may shorten the routing length and thereby reduce the number of routing switches and buffers the signal passes through. By doing so, the amount of FPGA circuitry allocated to implement the signal is reduced and the signal's active leakage power is thereby also reduced. One way to shorten a routing length is to assign a high priority to a signal during the place and route phase of designing the system.

The methods of the present invention may be performed in hardware, software, or any combination thereof, as those terms are known in the art. In particular, the present methods may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that transferred among computers connected to a network. Accordingly, the present invention is not limited to any particular platform.

Those having ordinary skill in the relevant arts of the invention will now perceive various modifications, variations, additions, and/or deletions that may be made as a result of the disclosure herein. For example, the above text describes the circuits and methods of the invention in the context of ICs such as programmable logic devices, including FPGAs. However, the invention may also be implemented in other electronic systems, for example, in printed circuit boards including discrete devices.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of ordinary skill in the art.

Accordingly, all such modifications and additions are deemed to be within the scope of the invention, which is to be limited only by the appended claims and their equivalents.

What is claimed is:

1. A method for optimizing leakage power in a system comprising:
    determining a static probability of a signal in the system; and
    if the static probability is in a high power probability range, then modifying the signal such that the static probability of the modified signal is in a low power probability range, and such that functionality of the system is not affected;
    wherein modifying the signal comprises modifying at least one of the group consisting of a source of the signal and a sink of the signal.

2. The method of claim 1 wherein the signal is a digital signal, and modifying the signal comprises inverting the signal.

3. The method of claim 2 wherein the high power probability range is a probability range from 0 to 0.5.

4. The method of claim 2 wherein the high power probability range is a probability range from 0.5 to 1.

5. The method of claim 2 wherein inverting the signal comprises inverting an output of a source of the signal and inverting an input of a sink of the signal.

6. The method of claim 5 wherein inverting the output of the source comprises adding an inverter at the output of the source.

7. The method of claim 5 wherein inverting the input of the sink comprises adding an inverter at the input of the sink.

8. The method of claim 5 wherein the system comprises a programmable logic device, the programmable logic device comprising a lookup table, and wherein inverting the signal has no area or performance penalty.

9. The method of claim 8 wherein inverting the output of the source comprises inverting each bit of the lookup table.

10. The method of claim 8 wherein inverting the input of the sink comprises permuting the lookup table memory contents such that the lookup table expects an inverted input.

11. The method of claim 1 further comprising biasing the static probability by modifying the system such that the static probability is closer to the low power probability range.

12. The method of claim 1 further comprising placing a source of the signal physically close to a sink of the signal.

13. The method of claim 12 wherein the step of placing comprises assigning a high priority to the signal in a place and route operation.

14. The method of claim 1 further comprising routing the signal in a manner that minimizes an objective function related to leakage power.

15. The method of claim 14 wherein the objective function is based on leakage power consumed in circuits used to route the signal.

16. A machine readable storage having stored thereon a computer program having a plurality of code sections for optimizing leakage power in a system, the code sections executable by a machine for causing the machine to perform the steps of:
    determining a static probability of a signal in the system; and
    if the static probability is in a high power probability range, then modifying the signal such that the static probability of the modified signal is in a low power probability range, and such that functionality of the system is not affected;
    wherein modifying the signal comprises modifying at least one of the group consisting of a source of the signal and a sink of the signal.

17. The machine readable storage of claim 16 wherein the signal is a digital signal, and modifying the signal comprises inverting the signal.

18. The machine readable storage of claim 17 wherein inverting the signal comprises inverting an output of a source of the signal and inverting an input of a sink of the signal.

19. The machine readable storage of claim 18 wherein the system comprises a programmable logic device, the programmable logic device comprising a lookup table, and wherein inverting the signal has no area or performance penalty.

20. The machine readable storage of claim 19 wherein inverting the output of the source comprises inverting each bit of the lookup table.

21. The machine readable storage of claim 19 wherein inverting the input of the sink comprises permuting the lookup table memory contents such that the lookup table expects an inverted input.

22. A system optimized for reduced leakage power comprising:
    a signal source having a modifiable output for sourcing a signal at the modifiable output; and
    a signal sink having a modifiable input for sinking the signal at the modifiable input;
    wherein the signal is selectively modified by the modifiable output and the modifiable input such that the signal has a static probability that is in a low power probability range, and such that functionality of the system is not affected.

23. The system of claim 22 wherein the signal is a digital signal, wherein the modifiable output is an invertible output, wherein the modifiable input is an invertible input, and wherein the signal is selectively inverted by the invertible output and the invertible input such that the signal has a static probability that is in the low power probability range, and such that functionality of the system is not affected.

24. The system of claim 23 wherein the system comprises a programmable logic device having a lookup table, and wherein selectively inverting the signal has no area or performance penalty.

25. The method of claim 24 wherein the signal source comprises a first lookup table, wherein the signal sink comprises a second lookup table, and wherein selectively inverting the signal comprises inverting each bit of the first lookup table and permuting the second lookup table memory contents such that the second lookup table expects an inverted input.

* * * * *